Nov. 26, 1935.  V. J. RODDY  2,022,573
METHOD AND MACHINE FOR FINISHING SCREW HEADS
Filed Dec. 26, 1934  2 Sheets-Sheet 1
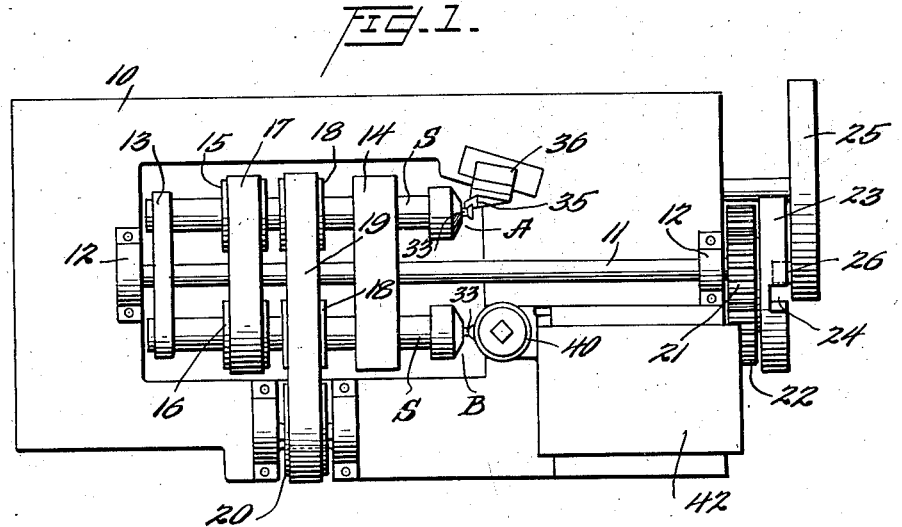
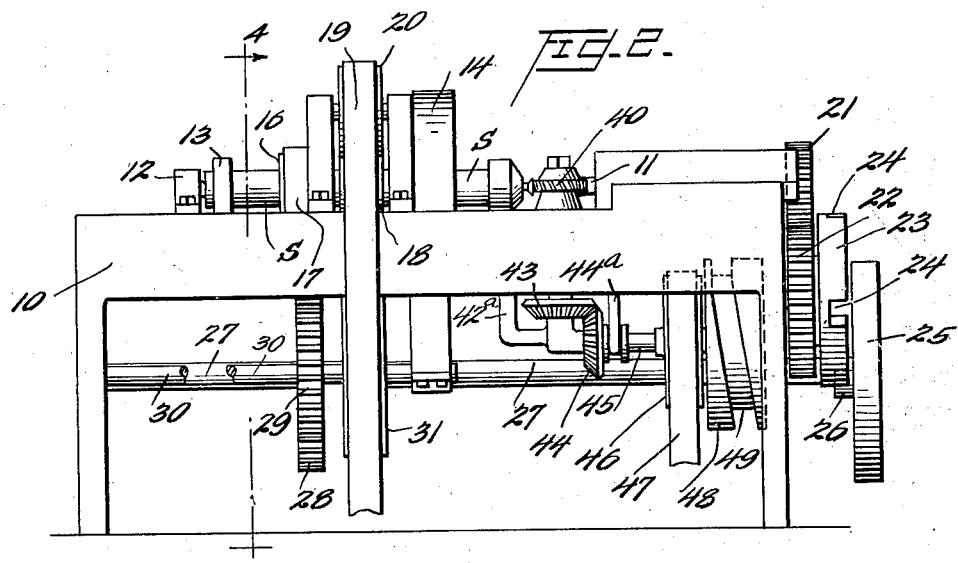

Nov. 26, 1935. V. J. RODDY 2,022,573
METHOD AND MACHINE FOR FINISHING SCREW HEADS
Filed Dec. 26, 1934 2 Sheets-Sheet 2
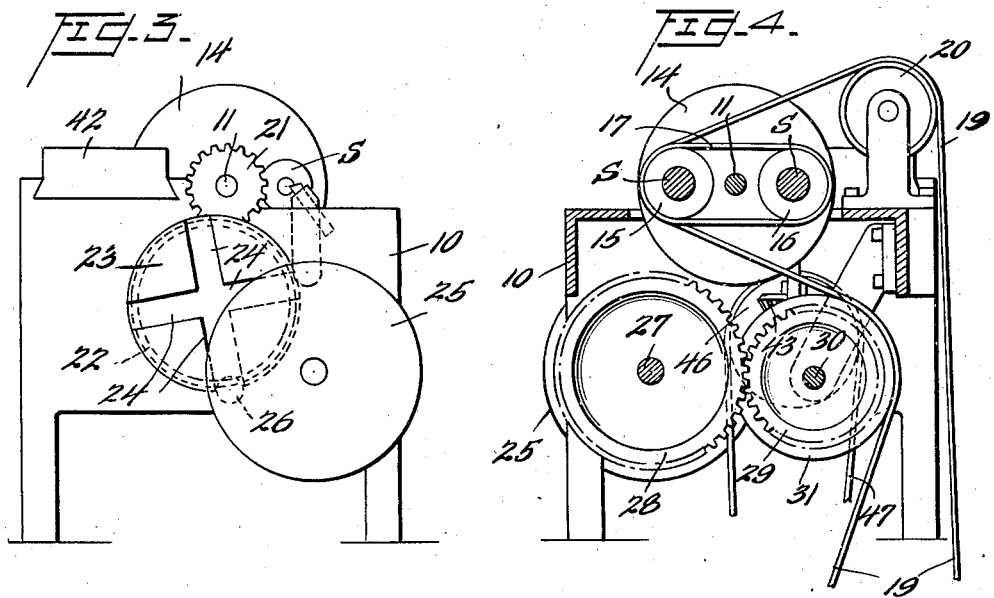
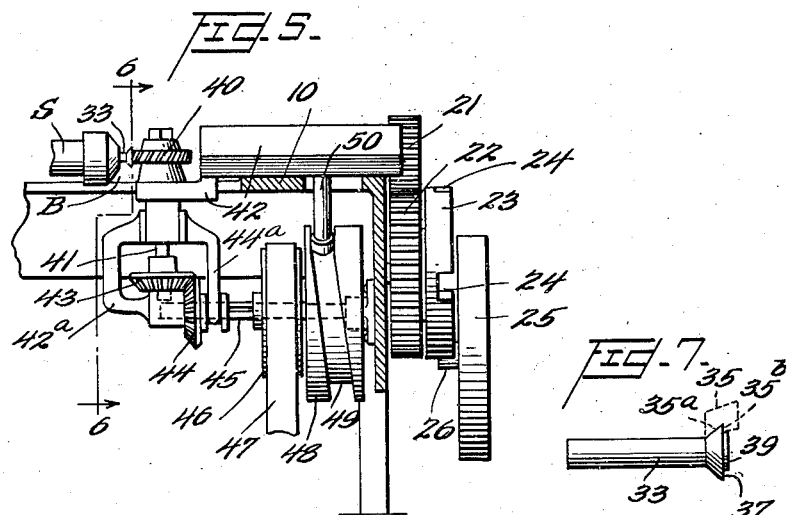
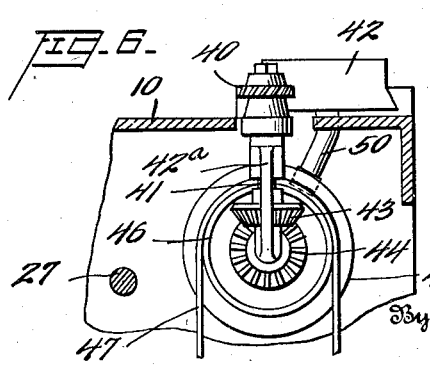

Patented Nov. 26, 1935

2,022,573

UNITED STATES PATENT OFFICE 2,022,573

METHOD AND MACHINE FOR FINISHING SCREW HEADS

Vincent James Roddy, Providence, R. I., assignor to American Screw Company, Providence, R. I., a corporation of Rhode Island Application December 26, 1934, Serial No. 759,268

15 Claims. (Cl. 10—10)

My invention relates to a method and machine for finishing the heads of screws and particularly screws similar to that shown in Patent No. 308,246, in which the top face of the screw head is provided with a recess or socket adapted to receive a tool for rotating or driving the screw.

In the manufacture of ordinary screws the head of the screw-blank, including the top face of the head, is first shaved or finished and the blank is then presented to a rotating cutter or saw which nicks the same, that is, cuts a groove across the top face of the head to receive the usual screw driver. In the manufacture of screws such as shown in said patent having a recess or socket in the head, it is customary to punch the socket or recess in the head before the head is shaved or finished. It has been found that screw-blanks having such sockets or recesses in the head cannot be satisfactorily finished by the procedure employed for ordinary screws. One of the difficulties lies in the fact that if the entire top face of such a blank is shaved by the form of cutter usually employed, the edges of the socket or recess are more or less burred, that is, small pieces of the metal are left clinging to the edges of the recess, and these are very difficult to remove and if left, they interfere with the insertion of the driving tool into the socket of the screw. My invention aims to provide a method and machine for overcoming the above difficulties in the manufacture of screws with recessed heads.

One form of machine embodying my invention is illustrated in the accompanying drawings and described in the following specification and my improved method of procedure will be clear from the structure and operation of such machine.

The machine of my invention is similar in many respects with the well-known type of screw machines illustrated in the patents to Sloan 173,355 and 180,281. Therefore, in the following disclosure of my invention, it has been thought unnecessary to illustrate or describe numerous details which are common and well known in this type of machine. The drawings and specification have accordingly been limited to the novel features of my invention and include only such old features as are necessary to a clear understanding of the structure and operation of my improvements.

In the accompanying drawings:

Figure 1 is a plan view of a machine embodying my invention;

Figure 2 is a side elevation of the same;

Figure 3 is an end elevation thereof viewed from the right in Figure 2;

Figure 4 is a vertical transverse section substantially on the line 4—4 of Figure 2;

Figure 5 is a vertical longitudinal section of a part of the machine;

Figure 6 is a vertical transverse section on the line 6—6 of Figure 5; and

Figures 7 and 8 are respectively side and end views of the screw-blank on which the machine is intended to operate.

Referring to the drawings in detail, the mechanism of the machine is mounted in a suitable frame 10 which may be constructed in any desired manner. A shaft 11 extends longitudinally of said frame and is supported in suitable bearings 12. Rigidly secured to said shaft 11 are transverse members 13, 14 and these members form a support in which two rotating spindles S are journalled. Said spindles are provided respectively with belt wheels 15, 16 on which a belt 17 is adapted to run so that the spindles are caused to rotate together. The spindles S are each provided with belt wheels 18, one of which is engaged at all times by a driving belt 19, which passes over a stationary belt wheel 20 mounted on the frame 10. The belt 19 is constantly driven from any suitable source of power such as a line shaft (not shown) and as a result the spindles S are caused to rotate continuously on their own axes.

The shaft 11 is intermittently rotated through substantially one half of a revolution by mechanism arranged at the end of said shaft. This mechanism comprises a pinion 21 which engages a gear 22 rotatably supported on the frame of the machine and having rigidly secured thereto a disc 23 provided with radial grooves 24. Adjacent the disc 23 is a disc 25 provided with a pin 26 which is adapted to cooperate with the grooves 24 in the disc 23 and intermittently rotate said last named disc and the shaft 11 as the disc 25 is rotated.

The disc 25 is mounted on a shaft 27 arranged in suitable bearings on the frame 10 and extends longitudinally of the machine. Beneath the frame of the machine the shaft 27 has rigidly secured thereto a gear wheel 28 which meshes with a gear wheel 29 rigidly secured to a shaft 30 rotatably supported in the frame 10. On the shaft 30 a belt wheel 31 is also rigidly mounted and this wheel is so arranged that the driving belt 19 passes over the same.

By this means, it will be seen that constant rotation is given to the shaft 30, the gear wheels 29 and 28, the shaft 27, and the disc 25. The engagement of the pin 26 on the disc 25 with the grooves in the disc 23 produces intermittent rotation of the disc 23 and such intermittent rotation is transmitted through the gears 21 and 22 to the shaft 11, and such intermittent rotation of the shaft 11 causes the spindles S to revolve intermittently about said shaft through an arc of substantially 180°. In other words, each spindle S is intermittently moved from one station indicated at A on the drawings to a second station B and then back to station A. The mechanism is so timed that each spindle will remain a certain period of time at each of the stations A and B.

Each of the spindles S is provided with means for receiving and holding a screw-blank such as shown at 33 in Figure 7. Such means is old and well known in the art and detailed description of the same is unnecessary. Also suitable mechanism such as commonly used in the art may be employed for feeding the blanks to the spindles S and ejecting the same therefrom.

A cutter 35 is arranged to engage a screw-blank held in one of the spindles S when such spindle is positioned at station A. The cutter 35 is preferably mounted on a movable tool post 36 which is commonly employed in the art and need not be illustrated in detail. The cutter 35 is preferably shaped as illustrated on an enlarged scale in Figure 7. It is provided with a cutting edge 35a which is adapted to shave or trim the underside of the head of the screw-blank and also with a cutting edge 35b which is adapted to shave the marginal portion 37 on the top face of the head of the blank. In other words, the cutting edge 35b extends only part way across the top face of the screw head and does not extend across the recess in the head indicated at 38. The central portion of said top face is, therefore, left unfinished as indicated at 39 in Figure 7 until the blank is carried to station B by the spindle.

As each of the spindles is brought to station B by the intermittent rotation of the shaft 11 heretofore described, the partially finished screw-blank held in the spindle is there subjected to the action of a rotating cutter such as a milling cutter 40 by relative movement of the spindle and cutter. In the arrangement shown, the cutter 40 is moved against the blank held by the spindle. This cutter is secured to a vertical shaft 41 which is rotatably mounted on a reciprocating table 42 which is adapted to move the milling cutter toward and from one of the spindles S located at station B. Constant rotation of the milling cutter 40 is effected through a bevel gear 43 secured to the shaft 41 and meshing with a similar gear 44 splined to a shaft 45 rotatably supported at one end in a bearing on the machine and held against longitudinal movement and slidably supported at the other end in a bearing on an arm 42a extending downwardly from the table 42 and beneath the gear wheel 43. One side of the gear wheel 44 is engaged by the lower end of the arm 42a and the other side of said gear wheel is provided with a grooved hub engaged by an arm 44a also rigid with the table 42. A belt wheel 46 is secured to the shaft 45 and this wheel is driven by a belt 47 from any suitable source of power. A cam wheel 48 is also secured to the shaft 45 and is constantly driven thereby, this cam wheel having a cam groove 49 which is engaged by an arm 50 rigidly secured to the table 42 and by this means reciprocation of the table is effected.

After a screw-blank is partly finished at the first station, as indicated in Figure 7, and is carried by the spindle to the second station, the milling cutter is moved against the unfinished portion of the top face of the head as indicated at 39 and this operation of finishing the face is completed. As before noted, during this operation both the screw-blank and the milling cutter are rotated, with the result the inner portion of the top face, that is, the portion surrounding the recess 38, will be finished to a clean and smooth surface with no burrs or fragments of metal left projecting into the recess. The cutting surface of the milling cutter is preferably of sufficient width to extend across the unfinished portion 39 on the top face of the head as this insures complete and accurate finishing of such portion. The parts of the machine are preferably so timed that after the operation of the cutter 40, the spindle S carrying the screw-blank is returned to the first station where the head is again lightly shaved to secure removal of any burr therefrom.

It will be apparent, of course, that the mechanism above described for carrying out my method may be varied in detail as desired. Also the method may be practiced by other forms of mechanism than that described. For example, the operation of shaving the marginal portion of the top face of the head might be performed in one machine and the milling operation for finishing the central portion of the top face carried out in another machine.

Having thus described the invention, what is claimed as new and desired to be secured by Letters Patent is:

1. The method of finishing the top face of a screw head on a screw-blank which consists in first shaving the marginal portion of said top face, leaving the central portion thereof unfinished, and then causing said central portion to engage the cutting surface on a rotating cutter by relative movement of the cutter and blank, and simultaneously rotating the blank and the cutter.

2. The method of finishing the top face of a screw head on a screw-blank having a recess in said face which consists in first shaving a portion of said top face around said recess, leaving the central portion thereof unfinished, then causing said unfinished portion of the top face to engage the cutting surface on a rotating cutter by relative movement of the cutter and blank, and simultaneously rotating the blank and the cutter.

3. The method of finishing the top face of a screw head on a screw-blank which consists in continuously rotating the blank on its axis, subjecting said top face to the action of a cutter to shave the marginal portion of said face, leaving the central portion thereof unfinished, and then subjecting said central portion to the action of a rotating cutter to finish the same.

4. The mehod of finishing the top face of a screw head on a screw-blank having a recess in said top face which consists in first shaving the top face of said blank around said recess, leaving the central portion thereof unfinished, rotating said blank on its axis, rotating a circular cutter having on its periphery a cutting surface of sufficient width to extend across said unfinished portion of the top face of the blank, and moving said blank and cutter into engagement while the blank and cutter are rotated.

5. A machine for finishing the top face of the head of a screw-blank comprising, in combination, a spindle adapted to receive and hold a screw-blank, means for continuously rotating said spindle and a screw-blank therein, a cutter arranged to shave the marginal portion only of said top face of the screw head, leaving the central portion thereof unfinished, a rotating cutter having a cutting surface thereon, means for rotating said rotating cutter, and means for moving said rotating cutter and spindle relative to each other to bring the cutting surface of said rotating cutter into engagement with the said unfinished portion of said top face of the screw head to thereby finish the same.

6. A machine for finishing the head of a screw-blank comprising, in combination, a spindle adapted to receive and hold a screw-blank, a cutter arranged to shave the marginal portion of the top face of the head, leaving the inner portion thereof unfinished, a rotating cutter having a cutting surface thereon and means to rotate the same, means for moving said rotating cutter toward said spindle to bring the cutting surface thereof into engagement with said unfinished portion on the top face of the blank to thereby finish the same, and means for rotating said spindle and the blank held thereby during the operation of said cutters on the blank.

7. A machine for finishing the head of a screw-blank comprising, in combination, a spindle adapted to receive and hold a screw-blank, means for intermittently moving said spindle from one station to a second station and back to the first station, means for continuously rotating said spindle while at both of said stations, a cutter arranged to engage the head on a screw-blank held in the spindle when the spindle is at said first station, said cutter having a part thereon adapted to shave the outer portion only of the top face of the screw head, leaving the inner portion unfinished, a rotating cutter arranged to cooperate with said spindle when the latter is at said second station, means for moving one of said last named parts, toward the other part, to thereby bring the blank held by the spindle into engagement with the rotating cutter to finish the unfinished portion thereof, and means for rotating said rotating cutter.

8. A machine for finishing the head of a screw-blank comprising, in combination, a cutter having a cutting edge thereon arranged to shave the marginal portion of the top face of the head on a screw-blank, a rotatable milling cutter arranged to operate upon and finish the inner portion of said top face on the head of the blank, means for continuously rotating the screw-blank including a spindle for holding the blank in position to be engaged by each of said cutters, and means for rotating said milling cutter.

9. A machine for finishing the head of a screw-blank comprising, in combination, a spindle adapted to receive and hold a screw-blank, a support for said spindle, means for intermittently rotating said support to move said spindle from one station to a second station and back to said first station, means for continuously rotating said spindle when the same is at each of said stations, a cutter arranged to cooperate with said spindle when the same is at said first station, said cutter having a cutting edge adapted to shave the marginal portion only of the top face of said head on the blank, leaving the central portion of said face unfinished, a milling cutter arranged to cooperate with said spindle when the same is at said second station, said milling cutter having a cutting surface thereon adapted to engage and finish said central portion on the top face of the screw-blank, and means for rotating said milling cutter.

10. A machine for finishing the head of a screw-blank comprising, in combination, a spindle adapted to receive and hold a screw-blank, means for continuously rotating said spindle to rotate said blank about its axes, means for moving said spindle from one station to a second station, a cutter arranged to cooperate with said spindle when the latter is at said first station, said cutter having means thereon to shave the marginal portion of the top face of the head on said blank, leaving the central portion of said face unfinished, a milling cutter arranged to cooperate with said spindle when the latter is at said second station, said milling cutter having thereon a cutting surface of sufficient width to extend across said unfinished portion on said top face of the blank, and means for rotating said milling cutter.

11. A machine for finishing the head of a screw-blank comprising, in combination, a spindle adapted to receive and hold a screw-blank, means for intermittently moving said spindle from one station to a second station and back to the first station, means for continuously rotating said spindle while at both of said stations, a cutter arranged to engage the head on a screw-blank held in the spindle when the spindle is at said first station, said cutter having a part thereon adapted to shave the outer portion only of the top face of the screw head, leaving the inner portion unfinished, a milling cutter arranged to cooperate with said spindle when the latter is at said second station, means for rotating said milling cutter, and means for moving the same against the blank held by said spindle to thereby finish said unfinished portion on the top face of the head of the blank.

12. A machine for finishing the head of a screw-blank comprising, in combination, a cutter having a cutting edge thereon arranged to shave the marginal portion of the top face of the head on a screw-blank, a rotatable milling cutter arranged to operate upon and finish the inner portion of said top face on the head of the blank, means for continuously rotating the screw-blank including a spindle for holding the blank in position to be engaged by each of said cutters, and means for moving said spindle and said milling cutter relative to each other to bring the milling cutter and blank into engagement.

13. A machine for finishing the head of a screw-blank comprising, in combination, a spindle adapted to receive and hold a screw-blank, a support for said spindle, means for intermittently rotating said support to move said spindle from one station to a second station and back to said first station, means for continuously rotating said spindle when the same is at each of said stations, a cutter arranged to cooperate with said spindle when the same is at said first station, said cutter having a cutting edge adapted to shave the marginal portion only of the top face of said head on the blank, leaving the central portion of said face unfinished, a milling cutter arranged to cooperate with said spindle when the same is at said second station, said milling cutter having a cutting surface thereon adapted to engage and finish said central portion on the top face of the screw-blank, means for rotating said milling cutter, and means for moving the same into engagement with the blank held in said spindle when the latter is at said second station.

14. A machine for finishing the head of a screw-blank comprising, in combination, a spindle adapted to receive and hold the blank, means for moving said spindle from one station to a second station and back to the first station, means for rotating said spindle and the blank held thereby, a cutter arranged at said first station and having a cutting edge thereon adapted to shave the marginal portion of the top face of the head of the blank held by said spindle, and a cutter arranged at said second station and having a cutting surface arranged to operate on and finish the inner portion of said top surface on the head of the blank.

15. A machine for finishing the head of a screw-blank comprising, in combination, a cutter having a cutting edge thereon arranged to finish a portion of the top face of the head of a screw-blank, a cutter arranged to operate on and finish the other portion of said top face on the head of the blank, means for rotating said blank including a spindle for holding the blank in position to be engaged successively by said cutters, and means for rotating said spindle.

VINCENT JAMES RODDY.